United States Patent
Shubert (10) Patent No.: US 9,930,894 B2
(45) Date of Patent: Apr. 3, 2018

(54) METHOD FOR PREPARING DECORATIVE CAKES

(71) Applicant: Lori Shubert, Key West, FL (US)

(72) Inventor: Lori Shubert, Key West, FL (US)

(*) Notice: Subject to any disclaimer, the term of this patent is extended or adjusted under 35 U.S.C. 154(b) by 0 days.

(21) Appl. No.: 14/487,364

(22) Filed: Sep. 16, 2014

(65) Prior Publication Data

US 2015/0079249 A1 Mar. 19, 2015

Related U.S. Application Data

(60) Provisional application No. 61/960,390, filed on Sep. 17, 2013.

(51) Int. Cl.

| | | |
|---|---|---|
| *A23G 1/00* | (2006.01) | |
| *A21D 13/00* | (2017.01) | |
| *A21C 15/00* | (2006.01) | |
| *A21C 15/02* | (2006.01) | |
| *A23P 20/20* | (2016.01) | |
| *A21D 13/24* | (2017.01) | |
| *A21D 13/47* | (2017.01) | |
| *A21D 13/32* | (2017.01) | |

(52) U.S. Cl.
CPC ........ *A21D 13/0087* (2013.01); *A21C 15/002* (2013.01); *A21C 15/02* (2013.01); *A21D 13/24* (2017.01); *A21D 13/32* (2017.01); *A21D 13/47* (2017.01); *A23P 20/20* (2016.08)

(58) Field of Classification Search
None
See application file for complete search history.

(56) References Cited

PUBLICATIONS

Kelli: Homemade Little Debbie Swiss Cake Roll; Published Online by Dec. 9, 2012 at: http://kelliskitchen.org/2012/12/homemade-little-debbie-swiss-cake-roll/ (Year: 2012).*

Houck: Chocolate Cream Swiss Roll; Published Online on: Apr. 16, 2012 at: http://www.cookingbymoonlight.com/2012/04/chocolate-cream-swiss-roll.html/. (Year: 2012).*

Leoni: Colored Pencil Mini cakes: published online by Apr. 29, 2011 at: http://oneshetwoshe.com/2011/04/colored-pencil-mini-cakes-perfect for a schools-out-party-she-leoni.html (Year: 2011).*

Pattycakesnj: What to do with left over fondant; posted online Dec. 15, 2010 at: https://www.cakecentral.com/forum/t/704738/what-to-do-with-leftover-fondant (Year: 2010).*

Early: Your Cup Cake; published online May 10, 2012 at: http://www.yourcupofcake.com/2012/05/using-edible-icing-sheets.html ( Year: 2012).*

Shubert, Lori, [Cupcake Sushi]. Retrieved from the Internet<http://www.cupcakesushi.com/>. Dec. 8, 2014.

* cited by examiner

*Primary Examiner* — Patricia A George
(74) *Attorney, Agent, or Firm* — Robert M. Downey, P.A.

(57) ABSTRACT

A method and template for preparing small, tender cakes is provided. The method includes preparing sheet cakes and slicing them into sleeves of cake. Frosting is template and frozen, and then rolled around the narrow cake leaf. Fillings may be added inside the cake leaf before rolling. The cake is then rolled similarly to maki-style sushi, sliced into shorter segments, and presented vertically on a serving dish. Decorations and additional frosting may be used.

12 Claims, 10 Drawing Sheets

METHOD FOR PREPARING DECORATIVE CAKES

BACKGROUND OF THE INVENTION

Field of Invention

The invention relates to the field of confectionary, more specifically to the preparation of small, tender cakes and prefabricated frosting sheets for use with them.

There is a high demand for cupcakes, most notably mini-cupcakes as a dessert, especially at special events such as fundraisers, showers, weddings, parties, etc. Mini-cupcakes, however, tend to be dry because they have little central volume. While baking, there is a high ratio of contact between the cake and baking pan, in contrast to larger cake types. With the small volume of a mini-cupcake, there is too much heat being transmitted to the outer surfaces of the cupcakes, resulting in a cupcake with very little in the way of a soft cake centre.

A need exists for a better method of preparing smaller sized cakes or cupcakes, especially to create small cupcakes without altering applicant's award-winning recipes used in her standard sized cupcakes.

SUMMARY OF THE INVENTION

In accordance with one embodiment of the invention, there is provided a method for preparing decorative cakes, including:
  a) preparing a uniform layer of frosting using a rectangular template;
  b) freezing the uniform layer of frosting;
  c) chilling, then cutting a standard sheet cake longitudinally and then again at a right angle to the first cut such that narrow strips of cake are formed;
  d) laying the frozen uniform layer of frosting on a cold work surface;
  e) laying one of the narrow strips of cake on the uniform layer of frosting,
  f) rolling the uniform layer of frosting up and around the narrow strip of cake to form an even layer of frosting around the narrow strip of cake, and rolling or pressing the whole into a cylinder of frosting around a core of cake; and
  g) slicing the cylinder in approximately 1-inch lengths.

In a further embodiment, the method includes, after laying one of the narrow strips of cake on the uniform layer of frosting, slicing the narrow strip of cake long-wise, placing an additional filling along a bottom portion resting on the uniform layer of frosting, and setting the top portion of the slice to the narrow strip of cake, sandwiching additional filling.

In a further embodiment, the method includes using wax paper to prevent the frozen uniform layer of frosting from sticking. In another embodiment, a woven mat is placed over the frozen uniform layer to exert even force during rolling.

In a further embodiment, both wax paper and a woven mat cover frozen frosting surface uniform layer.

In one embodiment, the method is performed on a refrigerated surface.

In another embodiment, the rectangular template is lined with wax paper prior to placement of the frosting into the template.

In another embodiment, the template has a cavity adapted to accommodate about four ounces of filling.

In another embodiment, the template is lined with waxed paper, four ounces of frosting is applied to the waxed paper, and a second sheet of waxed paper is applied on top of the frosting before pressing the frosting into the template.

In another embodiment, the method includes freezing the cylinder of frosting around a core of cake.

In one embodiment, the method includes slicing the frozen cylinder of frosting around a core of cake into approximately 1-inch segments. In another embodiment, the method includes dipping the cylinder in molten chocolate.

In a second embodiment, there is disclosed a template for preparing slabs of frosting for rolled cakes, the template including a solid rectangular form with a shaped cavity for filing, the template having shoulders to allow rolling approximately ⅛ of an inch of frosting. In another embodiment, the template is from 12-15 inches wide and long, and has a rectangular cavity with dimensions of 4.5-5 inches in width, 8.5-9 inches in length, and about ⅛ of an inch in depth.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 2:
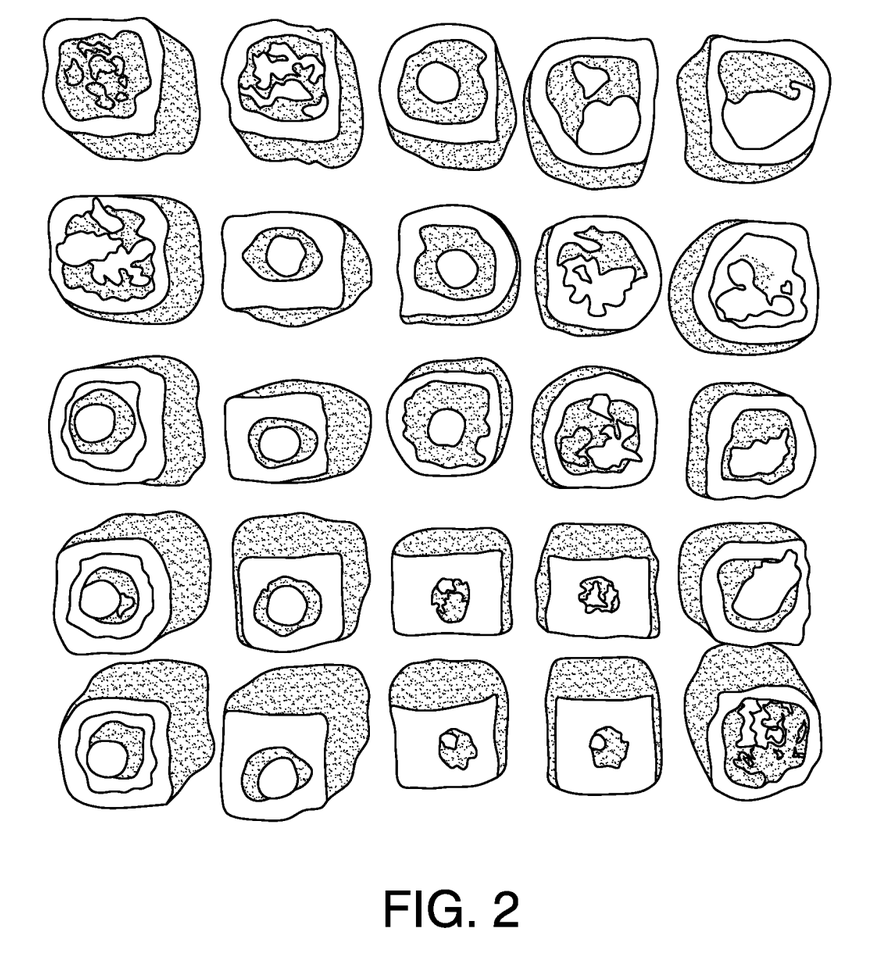
FIG. 2 shows a plurality of rolled mini sushi-styled cupcakes with frosting and chocolate outer coating resembling seaweed.

Preparation of the decorative sushi-styled cupcakes of the invention may be broken down into the preparation and baking of suitable cake, the preparation of frosting using a template according to the invention, and the assembly of the cake and frozen frosting. In FIG. 2, a variety of such cakes are illustrated on end and on their sides.

Final plating and decoration are done after the cakes are assembled. FIG. 2 is an illustration of the kind of variety possible with the method.

The problem to be solved was the provision of perfectly soft, tender cake within a rolled frosting. The appearance would be akin to sushi.

The method of the invention allows the use of standard cupcake recipes and baking the cupcake mix in a large, rectangular pan, so as to produce a single rectangular shaped baked product such that the desired moisture and flavour of a standard cupcake is retained. There is minimal or no drying at the outer surface of the resulting cake sheet. The cake sheet is then sliced longitudinally and then again to form a plurality (often 18) of 8 to 9 inch rectangular slices approximately one quarter to one half inch thick and of a length equal to the width and length of a rectangular baking tray.

A cake pan 13 inches long by 9 inches wide, and filled to a level of the cupcake mix, will produce a big block of cake approximately 4 inches high. A cake 13 inches by 9 inches will require less batter and is optimally about 3 inches high.

The cakes may be made in any flavour using Cupcake Sushi™ standard recipes.

As an example, one 13×9×3 pan yields 18 slices or narrow strips. The cake may be partially or totally frozen for slicing and assembly. Each of the cake's layers will have the high moisture content and flavour and texture of the cake block. The cupcake bases, or mixes, can be moister than standard cupcake mixes so as to make the resultant slices more flexible to roll.

One batch of frosting, per recipe yields 18 template uniform frosting layers. Each uniform frosting layer is laid flat, the top paper peeled back, and one rectangular slice of that cake is placed on top. The cake can be cut ⅓ down from the top to form two long pieces, so that filling can be added to what will be the centre of the cupcake. How this is done is described below.

A layer of filling, such as ganache or caramel and sometimes nuts are placed along the larger ⅔ portion and the ⅓ portion of cake is placed on top. The butter cream frosting is still affixed to the bottom sheet of waxed paper, and is curled upwards and bent gently around the cake. It is rolled and as the paper curls under it, the paper is pulled out so as not to get wrapped into the cake roll.

This rolling motion takes about four to five times to complete a cake roll and get it back to its original orientation. Then, a bamboo mat can used to squeeze and affix the butter cream to the cakes. The matt also helps creates the sushi shape.

Figure 7:
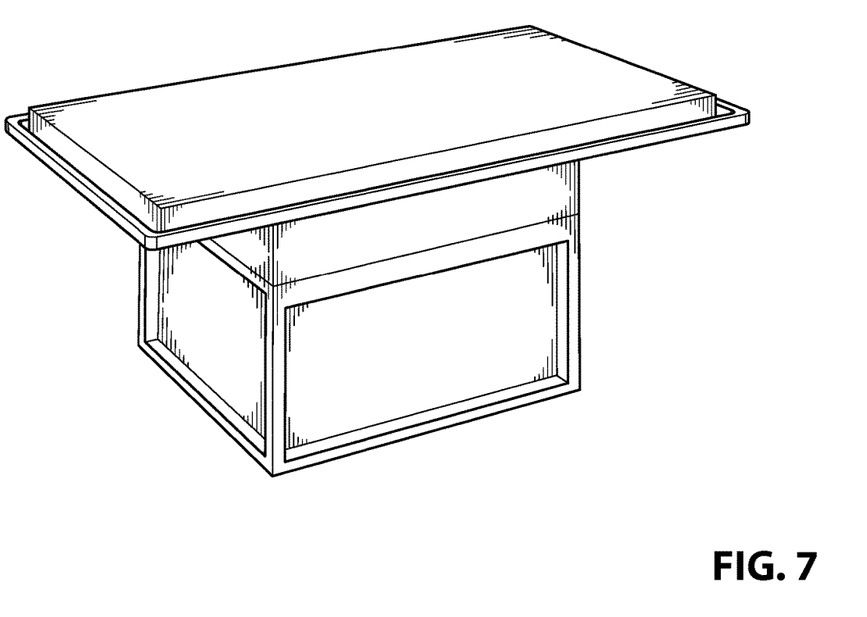
FIG. 7 is a page from a catalogue from Atlas Metals showing refrigerated food preparation cart.
Figure 8:
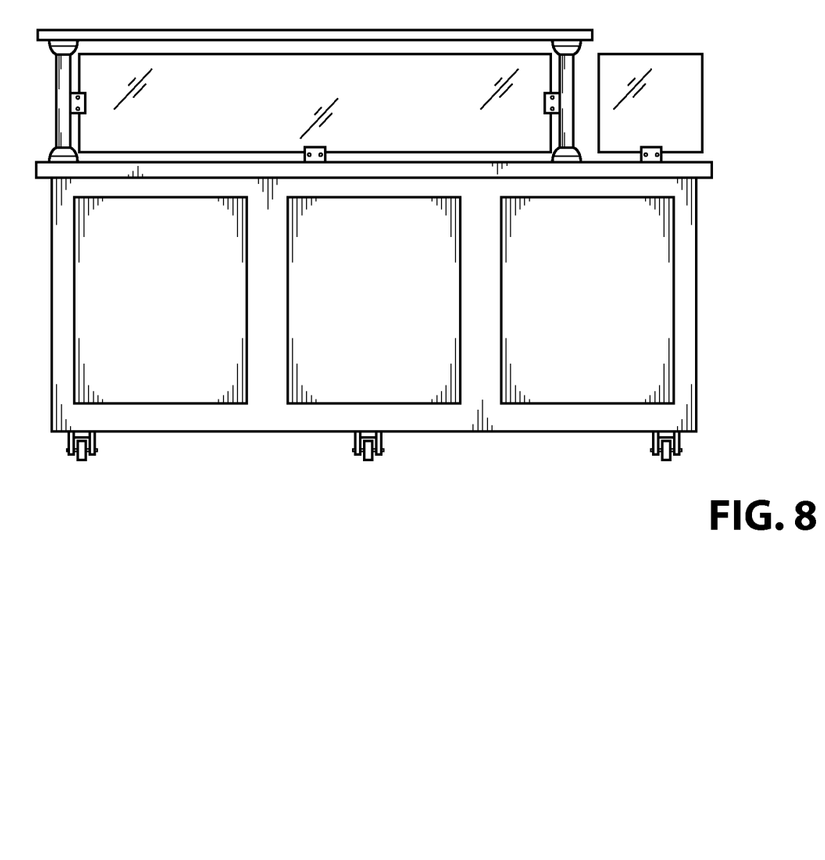
FIG. 8 is a specification for the design of a cart with a refrigerated rolling surface for use in preparing cakes and frostings of the invention.
Figure 9:
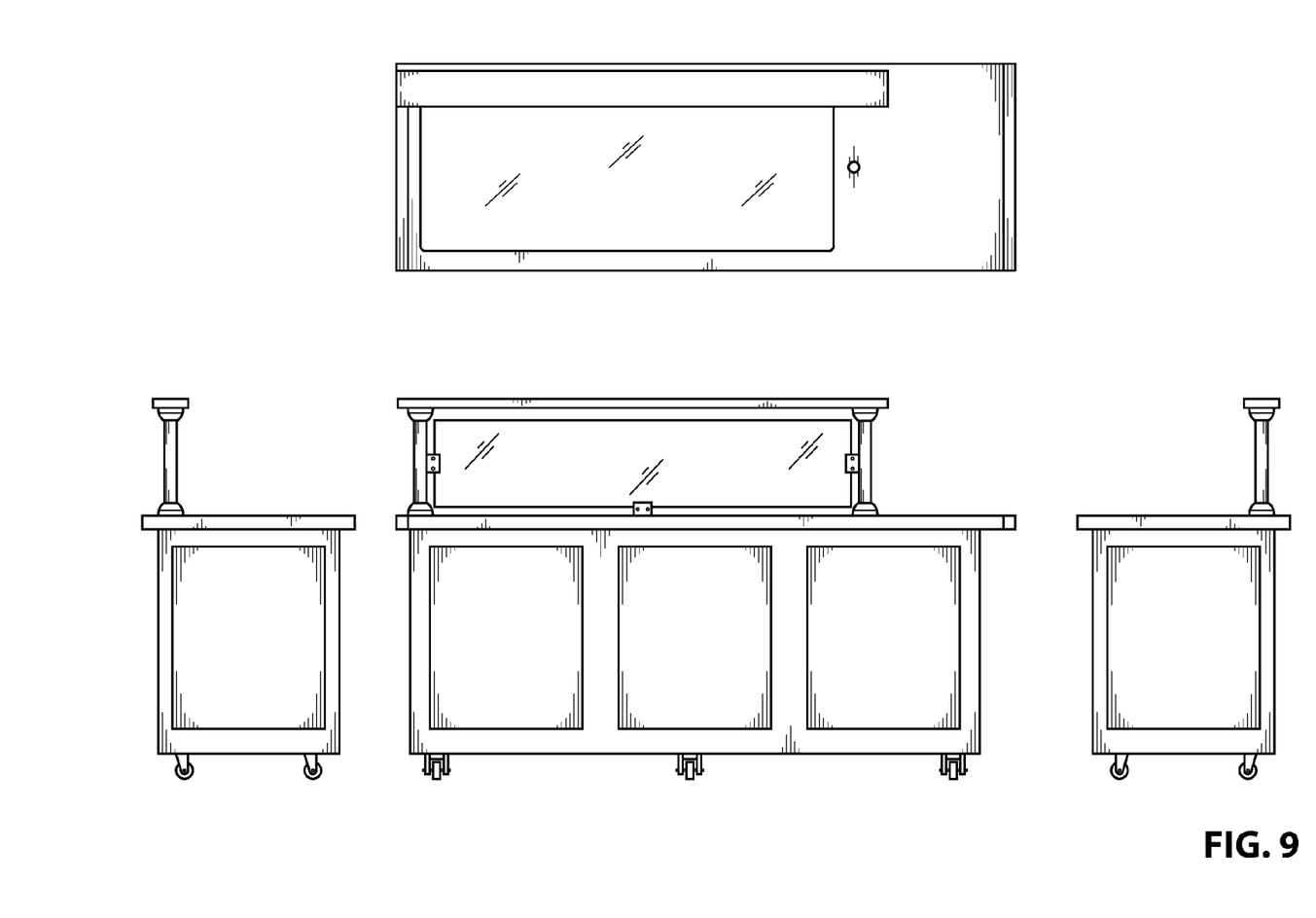
FIG. 9 is another design for a cart like the one in FIG. 8.
Figure 10:
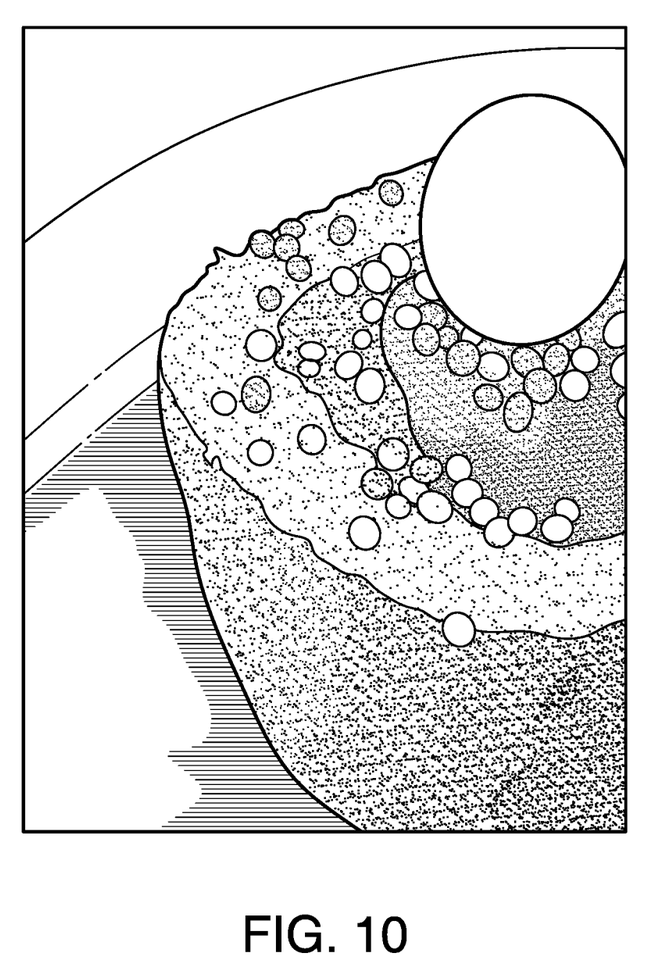
FIG. 10 is a larger illustration of a close-up of a cupcake sushi.

In the frozen pliable state, kept cool by a frozen work surface such as those illustrated in FIGS. 7-9, surface, the cupcake sushi roll can be molded into many shapes; round, half circle, or square, for example.

Different flavors and colors of cakes can be combined, making patterns inside the frosting "roll", and that show when the rolls are cut into final lengths or segments. The final product is similar to the shape and size of a mini cupcake, but without the dryness and toughness of associated with those types of cakes.

Figure 1:
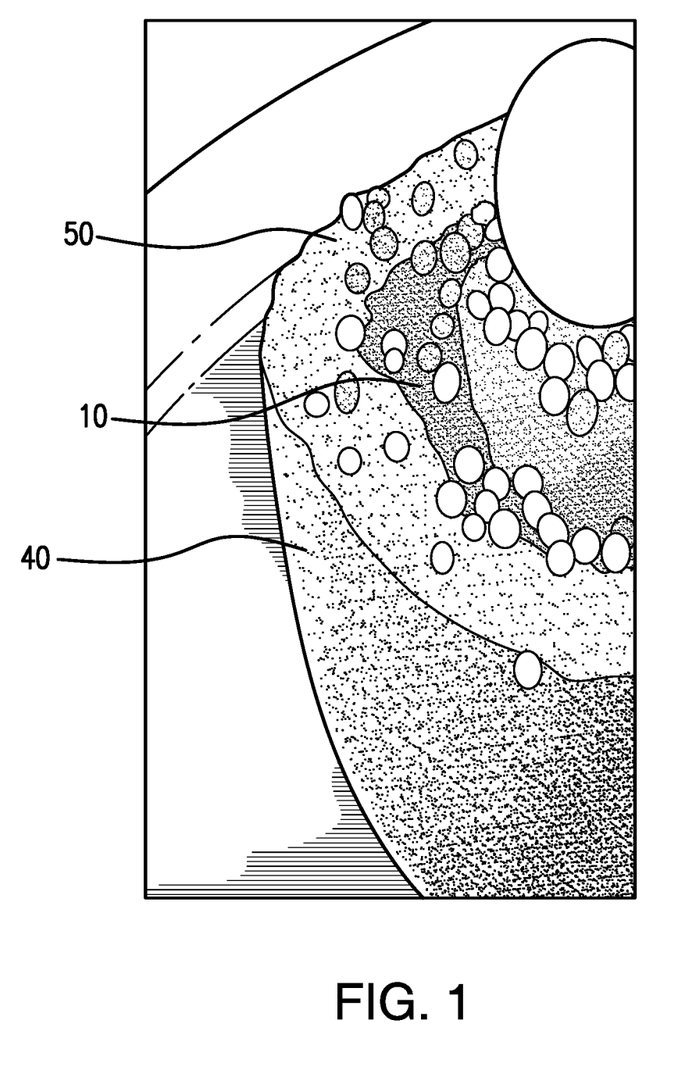
FIG. 1 illustrates the layering effect of cake, frosting, outer dark chocolate coating, and candy topping on one example of a cupcake of the invention.

These rolls, when cut, look like sushi. See FIG. 1 showing the circular shape and layers of frosting 50, cake 10, and chocolate coating 40. They are plated in that very form on garnished plates and can be served with chopsticks. Alternately, the cake rolls are flash frozen, cut and dipped in dark chocolate to be packaged and sold in bento style boxes. The dark chocolate looks like a seaweed wrap.

The process of encircling the prepared strips of cake into the cylinder of frosting was impossible until the present inventive strategy was determined. The rolling can only be accomplished if the frosting was frozen. However, freezing frosting led to another problem: frozen frosting is not easily shaped. It was a struggle to achieve the coating of the cake without destroying the integrity of the frosting, or the cake, or both. It will be recalled that the cake is exceptionally tender.

The invention lies in the solution of this problem, namely the method of preparing a layer of frosting in rectangular template, and freezing the frosting in that form.

A key of the present invention is a use of a template for preparing frosting for the cupcake sushi. Applicant has developed two forms of the template. One form of the template is a small rectangular board made of food-safe plastic, such as the design pictured in FIG. 3. This material used may be that used in the manufacturing of cutting boards (polypropylene, wood, etc.) and can be cleaned and sanitized as well as it's surface resistant to food particles that would lead to contamination and cross-contamination and of course make it difficult to clean.

Figure 4:
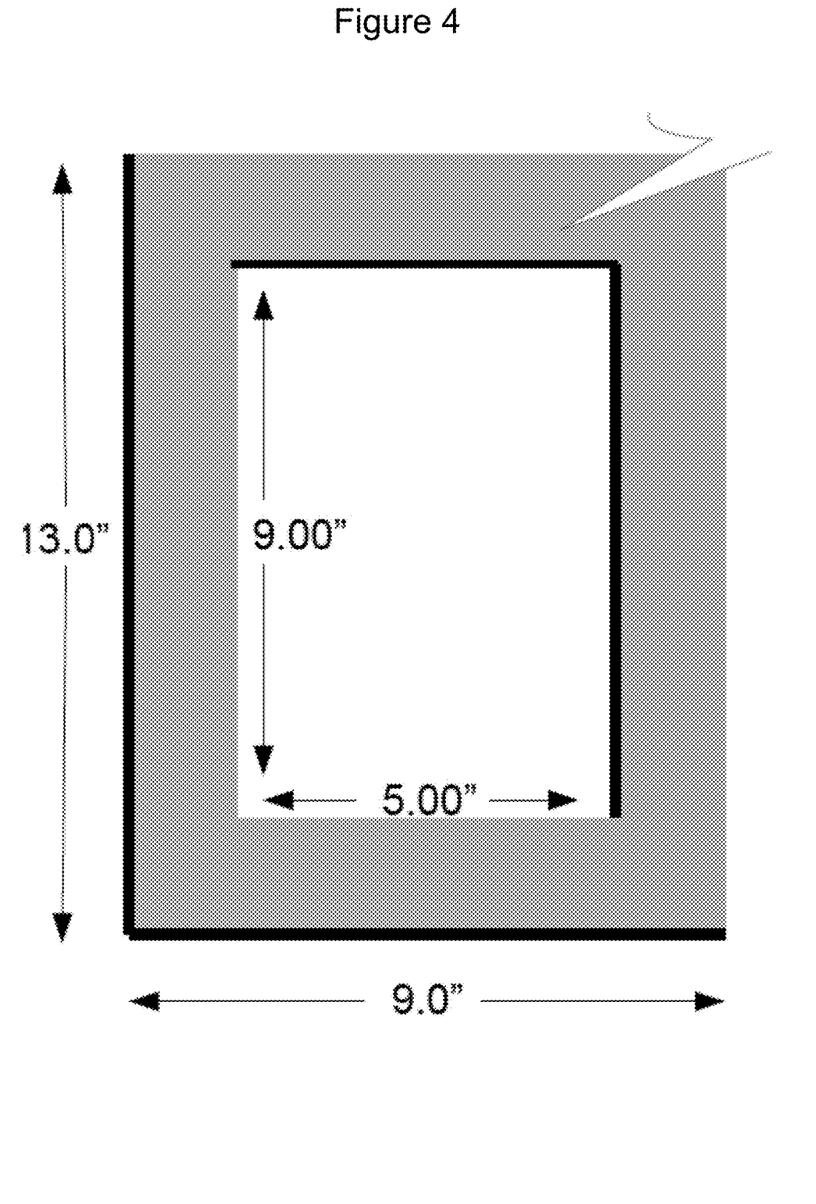
FIG. 4 is an alternate design for the frosting template.
Figure 5:
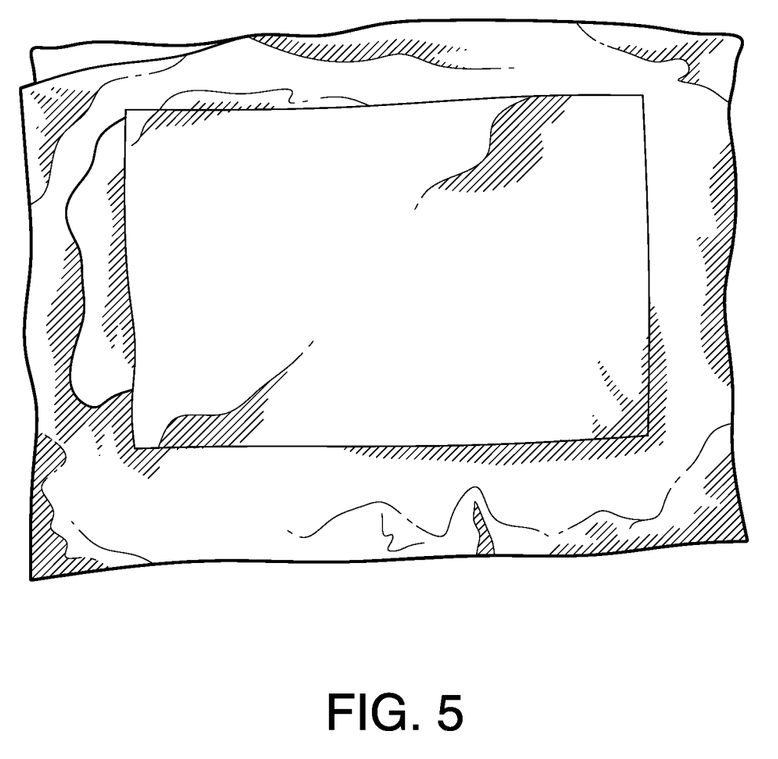
FIG. 5 is a template-prepared frosting layer frozen and ready for use.
Figure 6:
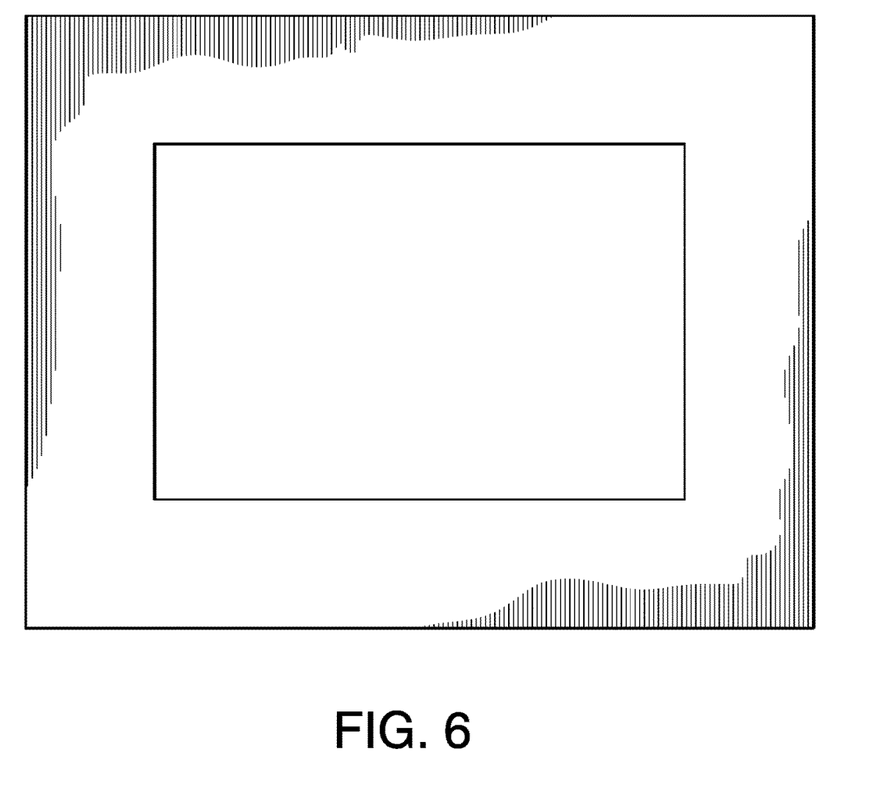
FIG. 6 is an example of a frosting template as used.

A second form of template is a food-safe, metal frame such as the one whose design is shown in FIG. 4, and an embodiment of which is pictured in FIG. 6. This embodiment is about ⅛ to ¼ inch thick, and is hollow in the middle, as shown. It could be made of aluminum or stainless steel.

Figure 3:
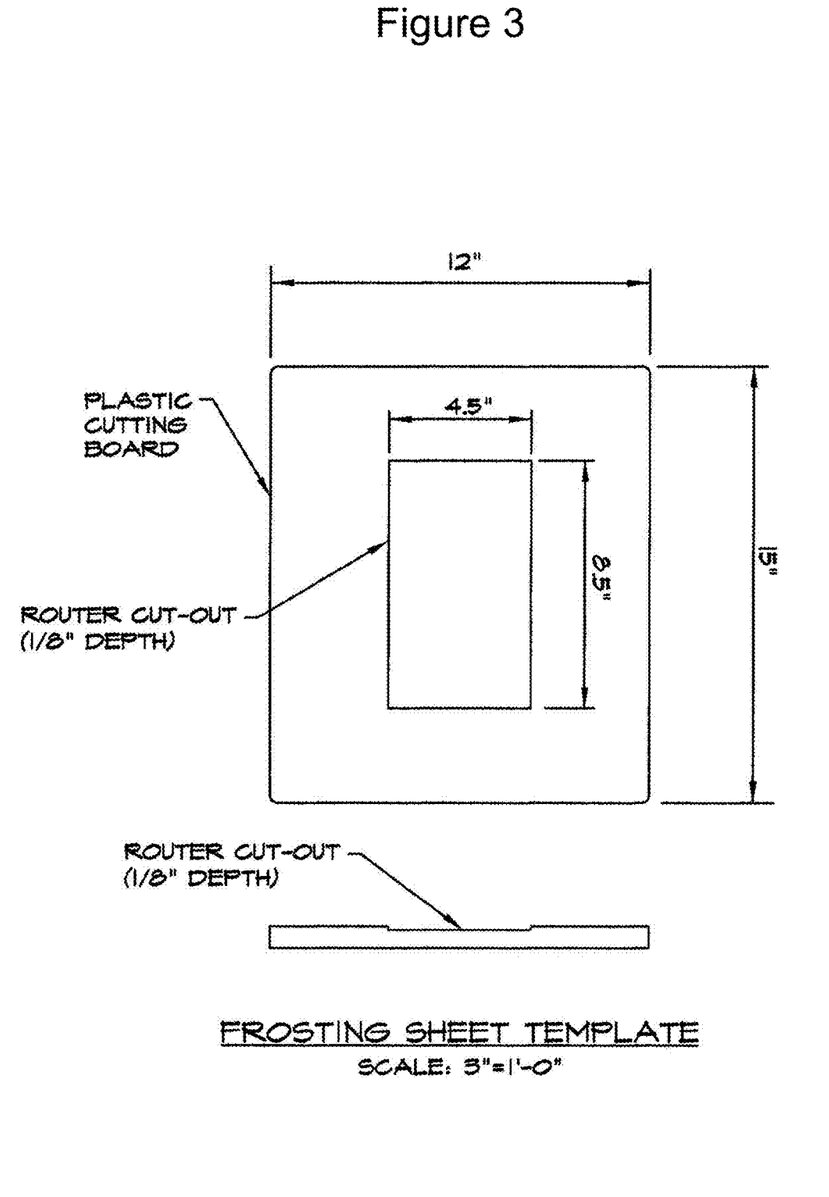
FIG. 3 is a design for a cupcake frosting template.

The board's exterior dimensions are important except for handling. In the rolling process, the interior area or central cavity is key. The board is three quarters of an inch thick and has a rectangular section removed from it. This is done by the use of a router sent to a little over ⅛ of an inch in depth. The router is run around a rectangle drawn on to the surface. The rectangle is 8.5 by 4.5 inches wide, in one version. Another embodiment is 5 by 8 inches.

This particular shape provides the correct amount, dimensions, and thickness of frosting needed to form around the cake that is precut in the pans after the baking process. The cakes fit perfectly with the pre-rolled frosting, providing a neat finish and a minimum of waste.

The frosting sheets are formed in the template using heavily coated waxed paper to line the template and ensure easy removal of the rolled frosting.

The waxed paper is cut larger than the dimensions of the template approximately 9×12". The bottom he just placed over the 4.5×8.5 void in the template surface. Using a piping bag, the frosting is then squeezed onto the wax paper within the parameters of the cavity, to only about 1.25 inches from the inner edges. In one embodiment, the amount of frosting placed in the cavity is 3 inches wide and an inch deep. A second sheet of waxed paper is in place over the freshly squeezed frosting, and a small rolling pin or tube-shaped wand is used to roll and spread the frosting over the template.

The frosting is thus pressed into the desired shape within the cavity, which has a volume of about 4 ounces of frosting, or a little more. The frosting is compressed into the shaped cavity of the template using side to side rolling with the rolling pin or wand (narrow rolling pin). Any extra frosting is squeezed out of the sides of the paper. The wand or rolling pin is larger than the cavity and stays flush with the surface of the template edges. This method results in little or no waste in frosting, which is generally buttercream and thus worth conserving. Finally, the finished sheet of frosting is removed from the template, labeled with the flavor of the frosting, and put into a freezer for later use. Often the wax paper originally used in the template is maintained around the frosting layer for freezing.

This process can be repeated as many times as desired. The sheets of frosting can be stored for long periods and removed from the freezer as needed.

In practice, the frosting needs to be kept very cold during assembly of the sushi cupcakes. It has been determined that a refrigerated surface was the best method for maintaining the frosting in a cold state while the cakes were assembled. Refrigerated surfaces are available in a cart form, for mobile cupcake preparation in front of an audience. A model sold by Atlas Metal is shown in FIG. 7. Beam is also a source.

FIGS. 8 and 9 are cart specifications prepared by inventor for ideal refrigerated surface carts.

Once the template frosting is prepared, the cake "slabs" may be rolled on frozen frosting as described above.

For the decorative layers of chocolate or dark candy on the outside of the rolled cupcake, the cupcake roll is frozen, sliced into sections (eight, for example), skewered and dipped in molten chocolate individually. See FIG. 1 and chocolate coating 40.

While specific embodiments of the invention have been described and illustrated, such embodiments should be considered illustrative of the invention only and not as limiting the invention as construed in accordance with the accompanying claims.

What is claimed is:

1. A method for preparing decorative cakes, comprising:
   a) rolling a layer of frosting onto a rectangular template to form a sheet of frosting;
   b) freezing said sheet of frosting to create a frozen layer of sheeted frosting;
   c) chilling, then cutting a standard sheet cake to form strips of cake;
   d) laying said frozen layer of sheeted frosting on a chilled work surface;
   e) laying one of the strips of cake on the frozen layer of sheeted frosting,
   f) rolling said frozen layer of sheeted frosting around the cake strip to form an even layer of sheeted frosting around the cake strip, wherein the cake strip is within the rolled sheeted frosting, to make a cylinder of sheeted frosting around a core of cake; and
   g) slicing said cylinder of sheeted frosting around a core of cake into approximately 1-inch lengths.

2. The method of claim 1, further including, after laying one of the strips of cake on said frozen layer of sheeted frosting, slicing the strip of cake long-wise, making two strips of cake wherein filling is placed between them whereas the cake is sandwiching said filling.

3. The method of claim 1, further including using wax paper to prevent the frozen layer of sheeted frosting from sticking.

4. The method of claim 1, further including using a woven mat around said frozen uniform layer to exert even force during the rolling.

5. The method of claim 1, further including using wax paper and a woven mat around said frozen layer of sheeted frosting to exert even force during the rolling.

6. The method of claim 1, wherein said chilled surface is refrigerated.

7. The method of claim 1, wherein said rectangular template is lined with wax paper prior to place of the frosting onto the template.

8. The method of claim 1, wherein said template has a cavity adapted to accommodate about four ounces of filing.

9. The method of claim 1, wherein said rectangular template is lined with waxed paper, four ounces of frosting is applied to said waxed paper, and a second sheet of waxed paper is applied on top of the frosting before rolling the frosting on the rectangular template.

10. The method of claim 1, further comprising freezing said cylinder of sheeted frosting around a core of cake.

11. The method of claim 10, further comprising slicing said frozen cylinder of sheeted frosting around a core of cake into approximately 1-inch segments.

12. The method of claim 10, further comprising dipping said cylinder of sheeted frosting around a core of cake into molten chocolate.

* * * * *